United States Patent [19]

Seaman

[11] Patent Number: 5,428,766
[45] Date of Patent: Jun. 27, 1995

[54] ERROR DETECTION SCHEME IN A MULTIPROCESSOR ENVIRONMENT

[75] Inventor: Michael J. Seaman, San Jose, Calif.

[73] Assignee: Digital Equipment Corporation, Maynard, Mass.

[21] Appl. No.: 983,907

[22] Filed: Dec. 1, 1992

[51] Int. Cl.$^6$ ............................................. G06F 11/00
[52] U.S. Cl. .................................... 395/575; 395/200
[58] Field of Search ..................... 395/575, 200; 364/265.1, 267, 267.1, 253, 253.1, 253.3, 264.6; 371/20.6, 40.1, 51.1, 20.1

[56] References Cited

U.S. PATENT DOCUMENTS

| | | | |
|---|---|---|---|
| 3,806,887 | 4/1974 | Schulte et al. | 395/575 |
| 4,439,829 | 3/1984 | Tsiang | 364/200 |
| 4,744,023 | 3/1988 | Nelskh | 364/200 |
| 5,195,181 | 3/1993 | Bryant et al. | 395/200 |
| 5,218,690 | 6/1993 | Boioli et al. | 395/500 |
| 5,255,264 | 10/1993 | Colten et al. | 370/24 |
| 5,282,201 | 1/1994 | Frank et al. | 370/94.1 |
| 5,333,268 | 7/1994 | Douglas et al. | 395/575 |

OTHER PUBLICATIONS

Kheredpir et al "Performance Managment in SONET—Based Multi Service Networks" Globe Com '91 IEEE 1991 pp. 1406–1411.

Lazar et al "Real Time Traffic Measurements on MAG-NET II" 1990 IEEE pp. 1191–1196.

*Primary Examiner*—Robert W. Beausoliel, Jr.
*Assistant Examiner*—Joseph E. Palys
*Attorney, Agent, or Firm*—Kenyon & Kenyon

[57] ABSTRACT

An error detection scheme to detect a variety of errors, including buffer accesses errors, buffer ownership transfer errors, and address recognition engine access errors, that may occur during the passing of messages between processors in a multi-processor computer system implementing a buffer swapping scheme. The error detection scheme of the present invention provides for the monitoring of bus transactions, maintaining a log of bus activity including buffer access transactions, identifying transactions involving buffer and address recognition operations and checking those operations to insure that they are consistent with the implemented buffer swapping scheme. Upon detection of an error the bus monitoring device asserts an error signal, freezes the log of bus activity and halts buffer swapping activity until the detected error is investigated and dealt with in an appropriate manner.

24 Claims, 8 Drawing Sheets

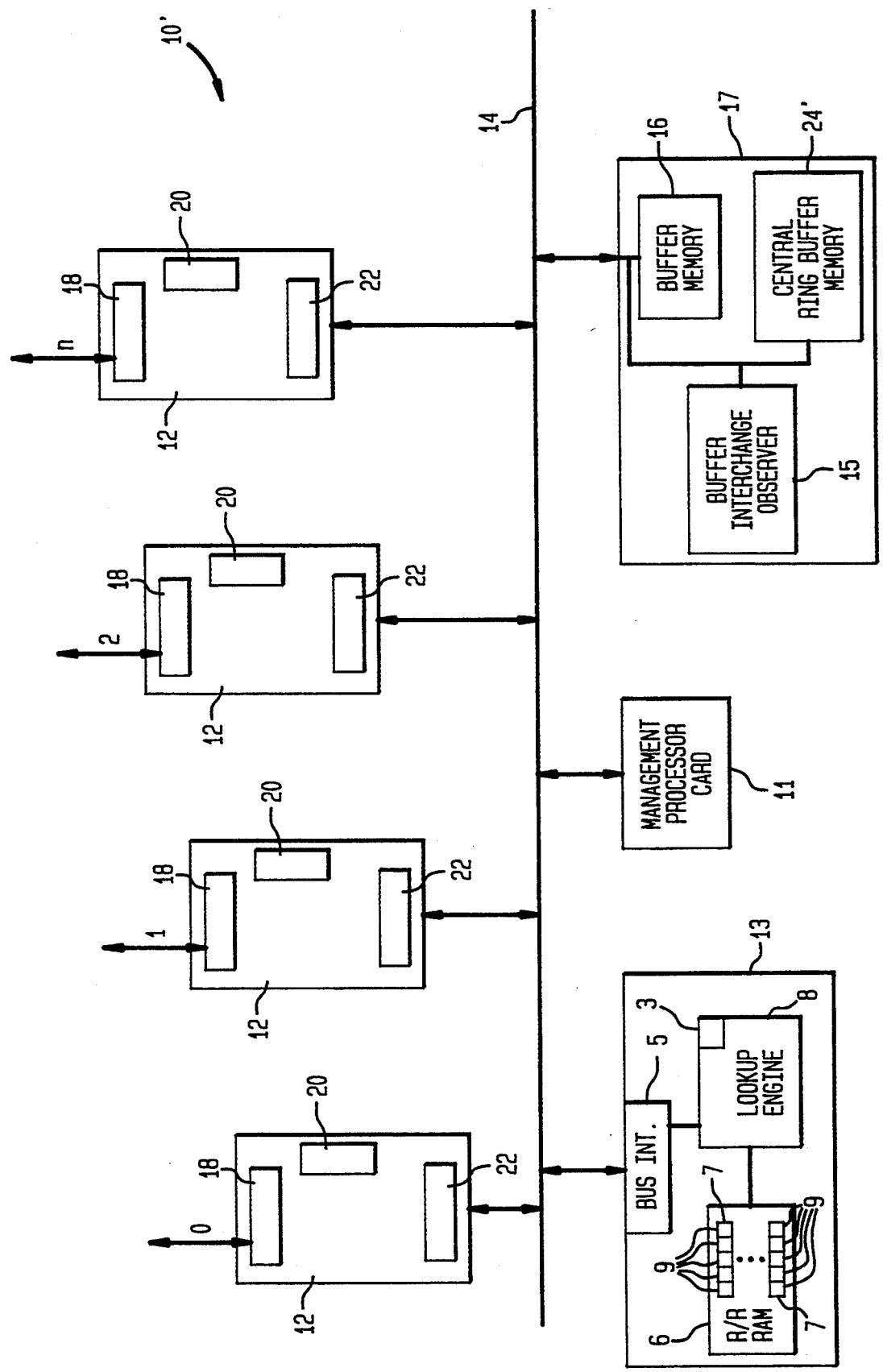

5,428,766

ERROR DETECTION SCHEME IN A MULTIPROCESSOR ENVIRONMENT

FIELD OF THE INVENTION

The present invention is directed to an error detection scheme in a multiprocessor computer system and, more particularly, to a scheme for detecting errors which may occur during the communication of messages between processors using a buffer swapping scheme.

BACKGROUND OF THE INVENTION

Modern computer systems are often implemented as multiprocessor systems wherein a plurality of processors are coupled to one another by, e.g., a bus. In addition to being coupled to the bus, each processor in the computer system my, for example, also be coupled to a data transmission service for the receipt and transmission of messages via the transmission service.

In the operation of the computer system it is often necessary for the processors to communicate messages to one another. Messages which are intended to be communicated by one processor to another processor may include, e.g., messages generated by one of the processors or messages received by one of the processors via the data transmission service coupled to the processor.

The processor generating the message or receiving the message from a transmission service is referred to as the source processor while the processor to which the message is being passed is referred to as the destination processor.

In one known scheme for passing messages between processors, each message is stored in a buffer by the source processor. The source processor then passes a pointer to the buffer which contains the message, to the destination processor to which the message is directed. The destination processor may then utilize the pointer to read the message from the buffer.

Once the message is read from the buffer, the destination processor may, e.g., as required, respond to the message or retransmit the message via the transmission service coupled to the destination processor. As should be understood, each processor can be either a source or destination of messages.

The known buffer pointer passing scheme prevents temporary input/output bandwidth crunches at any particular destination processor, as might occur, e.g., if each entire message was directly transmitted to the destination processor and several source processors needed to forward messages to the particular destination processor during the same time period. The passing of pointers permits each destination processor to schedule the movement of messages from the appropriate buffers to the respective destination processor. A particular destination processor can readily receive and store pointers and access the associated buffers for the full messages over a time period consistent with the input/output bandwidth of the particular destination processor.

The buffers used to communicate messages can all be arranged in a shared central memory, coupled to the bus. The use of a central memory simplifies the overall design requirements for the buffer system and provides flexibility in the allocation of buffers between processors. At initialization time, each source processor is allocated a number of buffers within the central memory consistent with the amount of message traffic expected from that source.

While the known buffer pointer approach to multiprocessor communication provides an advantageous scheme for effectively passing messages between processors, the scheme does not adequately provide for the detection of errors, such as illegal accesses to buffers in the shared central memory, which may occur during communication between various processors of the computer system. Such illegal accesses may include, for example, accesses by a processor to a buffer which does not contain a message intended for the processor accessing the particular buffer.

Accordingly, in the known system, errors which are caused by, e.g., faulty system components may go undetected with the potential result of unrecoverable errors in the communication of messages between processors and the loss of data.

In addition to failing to detect buffer access errors, the known buffer swapping scheme does not maintain a record of system buffer ownership, including a record of the buffer's recent history in terms of processor accesses, which may be necessary to allow for diagnosis of errors in the buffer system. Such a record of buffer ownership may also be necessary to recover buffers allocated to faulty system components.

Accordingly, the known buffer swapping scheme fails to provide an adequate means for error detection and correction with regard to processor accesses to the buffers which comprise the computer system's memory.

SUMMARY OF THE INVENTION

The present invention provides an error detection scheme for detecting a variety of errors associated with the passing of messages between processors in a multiprocessor computer system implementing a buffer swapping scheme.

In addition to the detection of errors, the error detection scheme of the present invention provides for the logging of all bus transactions that involve the communication of messages and a scheme for the reporting of errors which occur during operation of the buffer swapping scheme. Upon detection of an error, the error detection scheme provides for the reporting of the error to a control processor of the computer system and for the graceful halting of the communication of messages via the buffer swapping scheme until the detected error can be investigated and/or corrected as appropriate.

The error detection scheme of the present invention is capable of detecting buffer access errors resulting from unauthorized processor accesses to buffers contained in a buffer memory of the computer system. Other errors that may be checked for and detected depended on the implemented buffer swapping scheme.

Generally, the error detection scheme of the present invention uses a monitoring device, referred to as a buffer interchange observer, to monitor buffer swapping activity to verify that processor accesses to the computer system's buffers occurs in accordance with the implemented buffer swapping scheme. The buffer interchange observer is coupled to the other devices in the computer system including the processors and the computer system's buffer memory in a manner that permits the buffer interchange observer to monitor accesses to the buffers contained in the buffer memory. In a multiprocessor computer system where the various processors of the computer system and the buffer memory are coupled together by, e.g., a bus, the buffer interchange observer may be coupled to the bus in order to monitor the communication of messages between the various processors of the computer system.

While the error detection scheme of the present invention may be implemented with various buffer swapping schemes, in one embodiment, for example, the memory protection scheme is implemented in conjunction with a buffer swapping scheme wherein a pointer to a free buffer is returned to a source processor by a destination processor as a condition for the source processor to pass a pointer to a buffer containing a message directed to the destination processor. Thus, in such a computer system, the consumer of buffers, the destination processor, is made responsible for maintaining an adequate supply of the buffer resource. In this embodiment, the exchange of pointers to buffers, between the source and destination processors, occurs via transactions over the computer system's bus and thus, such exchanges may be readily monitored by the buffer interchange observer.

In accordance with the implemented buffer swapping scheme, the destination processor maintains a pool of pointers to free buffers and the source processor performs an independent sequence of steps, during the transfer of a pointer to the destination processor, to acquire one of the free buffers before transferring the pointer to the buffer containing the message for the destination processor. Each destination processor is arranged to maintain a set of ring memories, one dedicated to each potential source processor, to link each potential destination to all potential sources of messages.

The ring memories of the computer system associated with each potential source processor, and maintained by each potential destination processor, are assigned fixed preselected addresses. These fixed addresses are supplied upon power-up of the computer system to the buffer interchange observer which stores the information in a table for later use when checking for errors.

The ring memories for a particular destination processor can be implemented as a local memory at the destination processor. In such an embodiment, the destination processor need not use the bus to access the local ring memories. However, in another embodiment, to facilitate error detection and to simplify the complexity of the hardware required to implement the error detection and buffer swapping scheme, all of the ring memories can be implemented in a centralized memory resource accessible by all of the source and destination processors for the exchange of buffer pointers via the bus.

With the ring memories being implemented in a centralized memory, which is accessed by the processors via the bus, it is possible for the buffer interchange monitor to monitor accesses of the ring memories by the destination processors in addition to accesses by source processors by monitoring bus activity. Thus, in such an embodiment the buffer interchange observer can completely monitor ring memory accesses in addition to buffer accesses simply by observing the activity on the bus.

In still another embodiment, the buffer interchange observer, buffer memory and centralized ring memories may be implemented in close proximity to one another so that the buffer interchange observer can be used not only to detect access errors to both the buffers and ring memories but also to prevent unauthorized processors from accessing the buffers and/or ring memories to thereby protect the contents of the devices.

Each ring memory includes a series of locations for the storage of pointers to buffers that contain messages from the respective source processor that are directed to the destination processor associated with the ring memory. The use of dedicated ring memories removes the need to synchronize source processors transferring messages to a common destination processor. As described, each source processor has a defined, dedicated memory space within its ring memory for the storage of buffer pointers and, thus, can read and write to that memory space exclusive of other potential source processors.

The addresses of the dedicated ring memories are known to the buffer interchange observer, and each particular ring memory address is associated with a particular source and destination processor. Thus, it is possible to identify the source and destination processors properly associated with a given transaction from the known address of the ring which is being accessed by the processor via a bus transaction.

In addition to being able to determine the proper source and destination processors that should be associated with a particular ring memory by monitoring addresses placed on the bus during bus transactions, the buffer interchange observer is able to determine the identity of the actual processor initiating the ring memory or buffer access operation. The buffer interchange observer does this by reading a processor identification signal, placed on the bus by the processor implementing the bus transaction as part of the implemented bus protocol.

Accordingly, by monitoring the computer system's bus for activity relating to the buffer memory and the ring memories, the buffer interchange observer can detect errors including accesses to buffer or ring memory locations that violate the implemented buffer swapping protocol.

In addition to checking for errors, the buffer interchange observer also maintains a log of bus activity, including information on recent accesses to the ring memories, buffers and the sources and destinations of messages contained in the computer system's buffer memory.

In accordance with the buffer swapping scheme of the exemplary embodiment, a suitable indication, such as, e.g., an "ownership" bit is arranged at each location of a ring memory to mark the location as valid/not valid in respect of each of the source and destination processors linked by the particular ring memory. The ownership bit is used to communicate to a processor reading the location whether the pointer stored at the location is "owned" by that processor. In general, a location owned by the source processor corresponding to the ring memory contains a pointer to a free buffer that is available for transfer back to the source processor. On the other hand, a location owned by the destination processor corresponding to the buffer ring, contains a pointer to a buffer storing a message from the respective source processor that is intended for the destination processor.

A message transfer, via the transfer of a pointer to the buffer where the message is stored, can be performed in a series of bus transactions between any source processor and any destination processor, as will be described below. These transactions may be monitored by the buffer interchange observer to check, among other things, that the processor transferring a message via a pointer to a buffer actually owns the buffer at the time of the transfer.

In accordance with the exemplary buffer swapping scheme, a source processor having a message to send to a particular destination processor will initially store the message in a free buffer in the central shared memory which it owns. The source processor may then access via the bus, an address recognition engine to identify the appropriate destination processor. The source processor writes its identification request into an ARE ring buffer dedicated to the source processor and then reads the information identifying the correct destination processor from the same ARE ring buffer memory location after the ARE has serviced the information request and written the destination information into the ARE ring buffer memory location.

After identifying the correct destination processor via the address recognition engine, the source processor reads, via the bus, a next location of its ring memory associated with the intended destination processor. If that location is owned by the source processor, the source processor reads the pointer stored therein for use as a free buffer in a subsequent message transfer.

The buffer interchange observer of the present invention includes a buffer rights table containing information on buffer ownership. The buffer rights table is initialized by the computer system upon power up with the initial buffer ownership information. The buffer interchange observer uses the data in the buffer rights table to check transfers of buffer ownership to insure that the processor from which ownership is being transferred, was the owner of the buffer at the time of the transfer in ownership. When the change in buffer ownership is detected, the buffer interchange observer updates its buffer rights table to reflect the change in buffer ownership.

As described above, the source processor acquires a free buffer as part and parcel of the transfer of a message. This transfer of buffer ownership is checked by the buffer interchange observer for errors and the buffer rights table is updated accordingly.

The source processor, during a subsequent bus transaction, then writes, into the location of the ring memory from which it just read the pointer to the free buffer, the pointer to the buffer of the central memory where it stored the message for the particular destination processor. The source processor will also change the state of the ownership bit to indicate that the location is now owned by the respective destination processor to indicate that the location stores a pointer to a buffer containing a message for that destination processor.

By monitoring the bus, the buffer interchange observer will detect the ring memory access and the change in central memory buffer ownership caused by the source processor via a bus transaction. The buffer interchange observer will check to insure that the destination processor is authorized to access the particular ring memory and check to make sure that the source processor had ownership of the buffer at the time of the transfer. The buffer interchange observer will then update the buffer rights table to reflect the change in buffer ownership.

Each destination processor is operated to poll the locations of the its ring memories for owned locations, i.e., locations containing pointers to buffers that have messages for the respective destination processor. When the destination processor locates an owned location, it reads the pointer value stored therein and then overwrites that location with a pointer to a free buffer from its pool of free buffers. Thereafter, the destination processor changes the ownership bit to once again indicate that the source processor owns that location with a pointer to a free buffer stored therein. Accordingly, each destination processor must make a free buffer available for a particular source processor upon the reading of each message pointer.

Because the ring memories associated with each destination processor may be implemented on the same module as the destination processor, the destination processor need not initiate a bus transaction to access these local ring memories. Thus, the buffer interchange observer which monitors bus activity may not detect the destination processor's access to its ring memories and will not check the accesses for errors or to update its buffer ownership table when the destination processor reads the contents of the ring memory and changes the status of the ownership bit associated with the individual ring memory. Later, when the source processor reads the particular ring memory location, via a bus transaction, the change in buffer ownership will be detected and checked for errors.

When, e.g., a centralized ring memory is used, and the bus is used by the destination processor to access its ring memories, the buffer interchange observer will monitor these ring memory accesses and changes in buffer ownership to insure that they comply with the implemented buffer swapping protocol and update the entries in the buffer rights table accordingly.

In the above manner, a free buffer is made available by a destination processor to a source processor each time a pointer to a buffer containing a message is transferred to the destination processor. Moreover, the pointer exchange is completed by independent operation of each of the source and destination processors, via the series of bus transactions of the source processor to read and write to a respective dedicated ring memory and the separate polling/free pointer writing operation of the destination processor.

The use of dedicated ring memories, as described above, having fixed addresses at each potential destination processor, with one ring memory for each potential source processor, enables any particular destination processor to automatically know where messages are coming from and to which source processors it is returning free buffers.

The buffer interchange observer of the present invention may comprise several components in addition to the buffer rights table which are used to monitor the bus, to check for errors, and to maintain a log of bus transactions including those that involve buffer or ring memory accesses and changes in buffer ownership.

The buffer interchange observer may comprise, e.g., a block of memory, referred to as a LOGRAM for storing a record of bus transactions, a ring identification machine, a buffer operations checker, a buffer rights table, a ring protocol monitor, a master index machine and an address recognition engine access checker.

The buffer interchange observer's master index machine contains a table that provides the index number of the current bus master, i.e. a unique signal which identifies the processor which is initiating the bus transaction, when the processor identification signal read from the bus and associated with the bus transaction is supplied to it. In this manner, the master index machine is used to identify any processor which attempts to access a buffer or ring memory via a bus transaction. This ID information is then supplied to the other components of the buffer interchange observer, including the address recognition engine checker so that they can use the processor ID information when checking for errors.

As described above, the buffer rights table comprises a table of information about each buffer which may include, e.g., data on buffer ownership and data on which processors have permission to read particular buffers. Such read permission information is relevant when messages are broadcast to multiple processors in the computer system and read-only access is given to the buffer containing the message being broadcast.

As described above, the buffer rights table is initialized by the computer system upon power up or reset and then is updated to maintain a current record of buffer ownership. The contents of the buffer rights table may be used by the buffer interchange observer's buffer operations checker and ring protocol monitor.

The buffer interchange observer's ring identification machine includes a table which identifies the source and destination processor associated with each particular ring memory location. Like the buffer rights table, this ring memory information table is initialized by the computer system upon power up or reset. The ring identification machine uses its ring information table to determine whether a particular bus transaction involves a ring memory and to determine the source and destination processor involved in the bus transaction based on the address of the ring memory being accessed during the transaction.

The buffer operations checker is used to identify and check the validity of operations involving accesses to the buffers and transfers of buffer ownership. The buffer operations checker uses the data contained in the buffer rights table when checking for errors and updates the buffer rights table to reflect detected changes in buffer ownership.

While the buffer interchange observer's buffer operations checker monitors accesses to the buffers, the ring protocol monitor monitors and verifies processor accesses to the ring memories. Using the information contained in the buffer rights table, the processor ID information supplied by the master index machine and information on the implemented buffer swapping protocol, the ring protocol monitor verifies each processor's right to access the ring memories. If an unauthorized processor attempts to access a ring memory, the ring protocol monitor will detect the access error and assert an error signal.

The buffer interchange observer's address recognition engine checker, verifies that a processor attempting to access the address recognition engine is authorized to perform such an access and that the access operation is conducted in a manner that is consistent with the implemented request/response scheme associated with address recognition accesses.

To verify that a processor has ARE access permission the processor index number supplied by the master index machine is compared to information contained in an ARE access table. As with the buffer interchange observer's other information tables, the address recognition access checker's ARE access table is initialized by the computer system upon power up or reset.

The ARE access table is a table of information on each processor's right to access particular memory locations which comprise the request/response memory contained in the address recognition engine. If the processor attempting to access a particular address recognition engine ring memory location is listed in the ARE access table as being associated with the particular ring memory the accesses is authorized. However, if a processor attempts to access an ARE ring memory with which it is not associated, an access error has occurred and the buffer interchange observer asserts a signal over the bus indicating the occurrence of an address recognition access error.

The various components which comprise the buffer interchange observer work together, as described above, to detect buffer access errors involving, e.g., unauthorized buffer accesses; buffer transfer errors involving, e.g., transfers of buffer ownership and grants of read permission; ring memory errors including, e.g., ring memory access errors; and address recognition engine access errors.

Accordingly, as a result of the present invention's ability to detect the majority of errors that may occur during the implementation of a buffer swapping scheme, the error detection scheme of the present invention provides improved reliability, as compared to known systems.

Furthermore, by maintaining a record of bus transactions including those involving buffer ownership, the error detection scheme of the present invention preserves a log of the buffers' ownership which is useful for both the diagnosis of errors associated with the buffer system, and for the recovery of buffers allocated to faulty system components and the messages stored therein. This enhances the reliability of the buffer swapping scheme beyond the level of reliability possible with the mere detection and reporting of errors.

The error detection scheme of the present invention also has the capability of signaling the other processors in the computer system of an error situation and to gracefully bring a halt to buffer activity. As buffer activity is halted, the log which includes the information on the recent buffer activity and thus, the detected error is frozen. Once halted, the detected error can be investigated and corrected with buffer swapping activity being permitted to resume once the error situation is properly handled.

Accordingly, unlike known systems which fail to provide sufficient error detection capability, the error detection scheme of the present invention provides a method of detecting errors, logging buffer transactions for error detection and correction, and the capability to gracefully halt buffer activity when necessary to insure the integrity of the messages being communicated via the buffer swapping scheme.

BRIEF DESCRIPTION OF THE DRAWINGS

FIG. 1a is a block diagram of a representative multiprocessor computer system according to another embodiment of the error detection scheme of the present invention.

DETAILED DESCRIPTION

Figure 1:
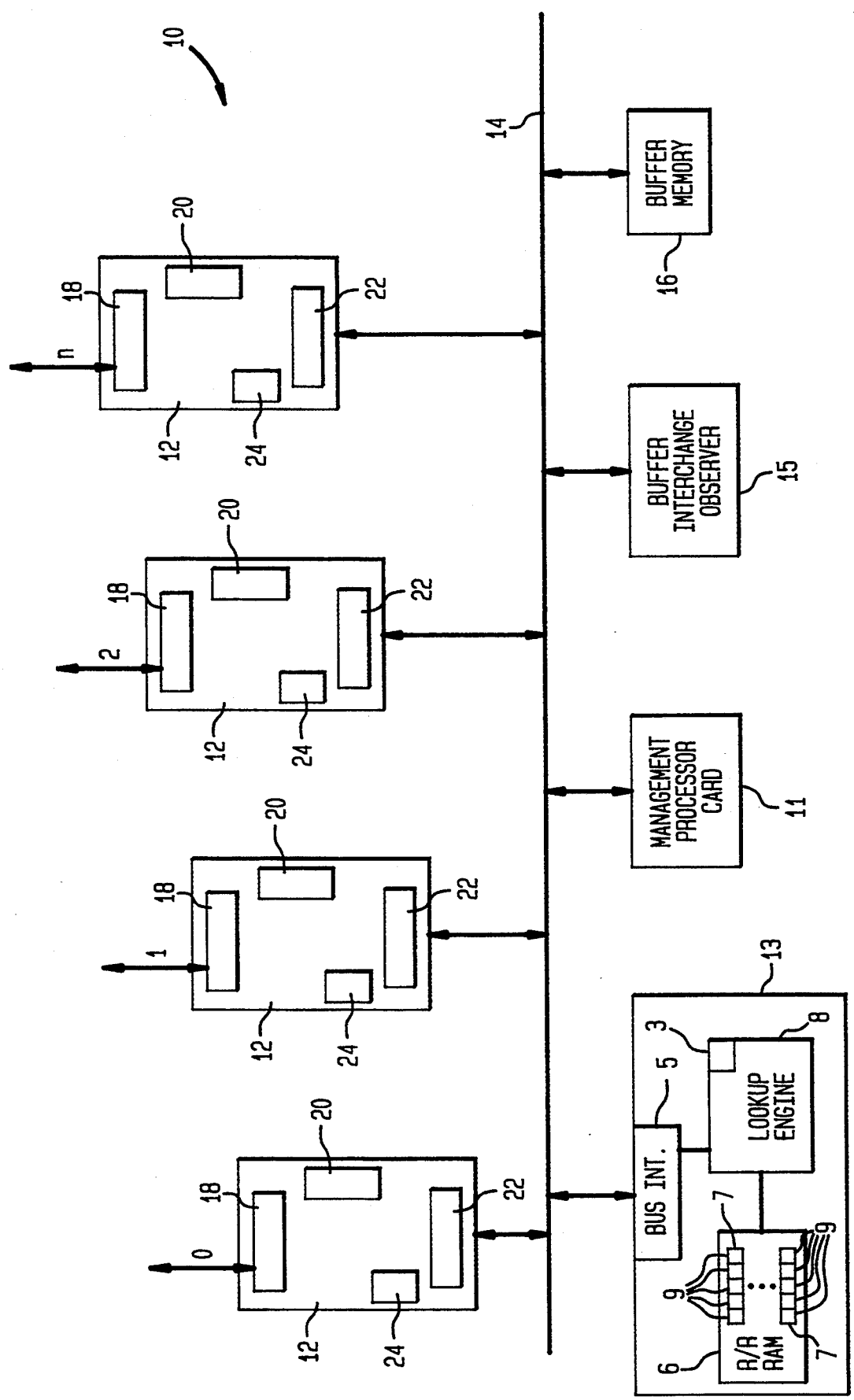
FIG. 1 is a block diagram of a representative multiprocessor computer system according to one embodiment of the error detection scheme of the present invention.

Referring now to the drawings, and initially to FIG. 1, there is illustrated a multiprocessor computer system generally designated by the reference numeral 10. In the illustrated system, a plurality of line cards 12 is arranged so that each line card 12 is coupled to a backplane bus 14. A management processor card 11 is coupled to the bus 14 for controlling computer system initialization and other management functions.

A central buffer memory 16 is also coupled to the bus 14 so that the line cards 12 can access the central buffer memory 16 to read and write messages that are to be communicated between the line cards 12.

There are n line cards 12, designated 0 to n, which together provide a multi-protocol router/bridge in a computer network (not illustrated). Each line card 12 comprises a line interface 18, a processor 20, a bus interface 22 and a ring memory 24.

An address recognition engine 13, coupled to the bus 14, may be accessed by the line cards 12 to determine the identity of the destination line card 12 to which a message is to be transmitted.

A buffer interchange observer 15 is coupled to the bus 14 to permit the monitoring of bus activity including activity involving communication of messages between the processors 20 on the line cards 12 via use of buffers located in the buffer memory 16 and the ring memories 24.

FIG. 1a is a circuit diagram of a computer system 10' in accordance with another embodiment of the present invention. Components of the computer system 10' of FIG. 1a are the same or similar to the components of FIG. 1 and are, for convenience numbered the same in both figures.

In the alternative embodiment of the multi-processor computer system illustrated in FIG. 1a, all of the ring memories which are associated with the n line cards are located in a central ring memory 24'. The central ring memory 24' may be located in close proximity to the central buffer memory 16 and the buffer interchange observer 15. In such an embodiment, all accesses to the ring memories are conducted via the bus 14 enhancing the ability of the buffer interchange observer 15 to monitor all ring memory accesses by monitoring activity on the bus 14.

For example, as shown in FIG. 1a, the buffer interchange observer 15, central ring memory 24' and central buffer memory 16 may be implemented in a single module 17 which is coupled to the bus 14. In such an embodiment, in addition to detecting errors, the buffer interchange observer 15 can prevent unauthorized accesses to the central ring memory 24 and central buffer memory 16 by first checking for errors before either the central ring memory 24 or central buffer memory 16 are permitted to be accessed. Thus protecting the contents of the central ring memory 24 and central buffer memory 16 from being erroneously altered.

Referring again to FIG. 1, each line interface 18 is adapted to be coupled to a data transmission service, such as, e.g., $T_1$ or 64K bps services provided by long distance telecommunication companies, or to a LAN to receive and transmit data packets from and to other components of the computer network. The line interfaces 18 are each configured to provide physical and data link level functionality according to a network protocol implemented on the data transmission service to which the particular line interface 18 is to be coupled.

The processor 20 of each line card 12 performs routing or bridging processing in respect of data packets received at or to be transmitted from the respective line card 12. On the receive side each processor 20 i.e., each source processor 20, examines the network address contained in the header of a received data packet and accesses the address recognition engine 13, via the bus 14, to determine the correct destination processor 20.

The address recognition engine 13 includes a bus interface unit 5 which couples the address recognition engine 13 to the bus 14. The address recognition engine 13 also includes a lookup engine 8 coupled to the bus interface unit 5 and to a request/response RAM 6. The request response ram includes a series of ARE ring buffers 7. Each ARE ring buffer 7 is dedicated to one of the processors 20 and includes a series of memory locations 9. Each memory location 9 is used to store information requests and responses associated with the particular processor 20 to which the ARE ring buffer 7 is dedicated.

In accordance with an implemented ARE access scheme, each processor 20 receiving a message for routing to another processor 20 writes certain header information, including the network address, into a memory location 9 of the ARE ring buffer memory 7 dedicated to the particular processor 20. The processor 20 sets an ownership bit associated with the memory location 9 to indicate to the lookup engine that the lookup engine now owns the memory location 9 and that the memory location 9 contains an address request.

The address recognition engine's lookup engine 8 polls the ARE ring buffers 7, e.g. on a round robin basis, for memory locations 9 containing requests to be serviced as indicated by the particular memory locations ownership bit being set. Upon finding a memory location which contains a request, the lookup engine 8, which includes a lookup table 3 containing information on network addresses and the transmission services coupled to each line card 12, accesses the lookup table 3 to obtain the information on the correct destination processor 20 and line card 12 to which a particular message is to be forwarded.

Using information obtained from the lookup table 3, the lookup engine 8 responds to the request by writing the appropriate information identifying the destination processor 20 into the particular ARE ring buffer memory location 9 which contained the information request being serviced. The lookup engine 8 then de-asserts the ownership bit indicating that the processor 20 to whom the ARE ring buffer is dedicated again owns the location 9 which contains the response to the information request.

The particular processor 20, which wrote the request into the ARE ring buffer memory location 9, may then read the response, via the bus 14, from the memory location 9 into which it wrote the original request.

Each subsequent time a particular processor 20 writes an information request into one of the dedicated ARE ring buffers 7, it access the next memory location 9 in the ring buffer, sequentially traversing the ARE ring buffer memory locations 9.

By accessing the address recognition engine in the above manner, a source processor 20 which receives a message is able to determine which line card 12 and destination processor 20 should be utilized to transmit the data packet for continued routing or bridging within the computer network.

Accesses to the address recognition engine 13 via the bus 14 are monitored by the buffer interchange observer 15. The buffer interchange observer 15 checks to determine that each processor 20 only accesses ARE ring buffers 7 which are dedicated to the processor 20 attempting the access operation. The buffer interchange observer also checks to insure that the individual ARE ring buffer memory locations 9 are written to in a sequential order in accordance with the implemented address recognition engine access scheme. If an address recognition engine access error is detected, the buffer interchange observer's asserts an error signal over the bus 14, informing the line cards 12 and the management processor card 11 of the error. Each data packet is a potential "message" to a processor 20 of another line card 12, i.e., the received data packet must be transferred to the destination processor 20 of the transmitting line card 12 for processing and eventual transmission via the line interface 18 of the other line card 12. Accordingly, the multiprocessor computer system 10 illustrated in FIG. 1 provides an example of a high message traffic system. Each processor 20 will be primarily processing data packets that are received from other processors 20 or are to be communicated to other processors 20, to complete the transmission of data packets through the router or bridge provided by the multiprocessor computer system 10.

To that end, each processor 20 will store each received message in a free buffer in the buffer memory 16 via the respective bus interface 22 of the line card 12. The bus interface 22 operates according to a bus protocol implemented on the bus 14 to acquire control of the bus 14. As required by the bus protocol, each processor 20 places a processor identification signal on the bus 14 whenever one of the processors 20 initiates a bus transaction.

After acquiring control of the bus 14, the processor 20 of the receiving line card 12 performs a write operation into the selected buffer of the buffer memory 16 via the bus 14. A pointer to the buffer is then transmitted to the destination processor 20 of the transmitting line card 12, via the bus 14, which utilizes the pointer to read the full data packet from the buffer memory 16 for network processing and eventual transmission.

According to the error detection scheme of the present invention, the buffer interchange observer 15 monitors the bus 14 and checks the operation of writing the received message into the buffer memory 16 and the transmission of the pointer to the destination processor 20 to insure that the detected activity is consistent with the implemented buffer swapping protocol.

In the exemplary embodiment illustrated in FIG. 1, the ring memory 24 of each line card 12 is divided into n buffer rings, one dedicated to each of the other line cards 12 of the system 10 and one dedicated to the processor 20 of the same line card 12. (In the exemplary system, a data packet received by a line card 12 that is ultimately to be transmitted by the same line card 12, is sent through the same message forwarding scheme as other data packets from the line card back to the line card.) The ring memories 24 are each used to store pointers from the other line cards 12 until the destination processor 20 of the line card 12 can perform a read bus transaction over the bus 14 to read the full data packet from the central memory 16.

In accordance with the error detection scheme of the present invention, the buffer interchange observer 15 monitors all ring memory and buffer accesses conducted via the bus 14 in accordance with the implemented buffer swapping scheme to detect errors. However, not all accesses to the line card's ring memory 24 require a bus transaction for example, the processor 20 of each line card 12 can access the ring memory 24 contained on the line card 12 directly without having to perform an operation on the bus 14.

Thus, accesses of the ring memory 24 by the processor 20, located on the same line card 12 as the particular ring memory 24, occur without observation and thus without error checking being performed by the buffer interchange observer 15 of the present invention. However, whenever a source processor 20 wants to send a received message to another line card 12 it must use the bus 14 which couples the source and destination line cards 12 together. Thus, a bus transaction is required for the source processor 20 to access the destination line card's ring memory 24.

Accordingly, all accesses of ring memories by source processors 20 will be monitored by the buffer interchange observer 15, which monitors bus activity to detect errors. However, activity which is internal to the individual line cards 12, such as ring memory accesses by the destination processor 20, i.e., the processor on the transmit line card 12, will not require a bus transaction and thus the accesses will go unmonitored by the buffer interchange observer 15.

Figure 2:
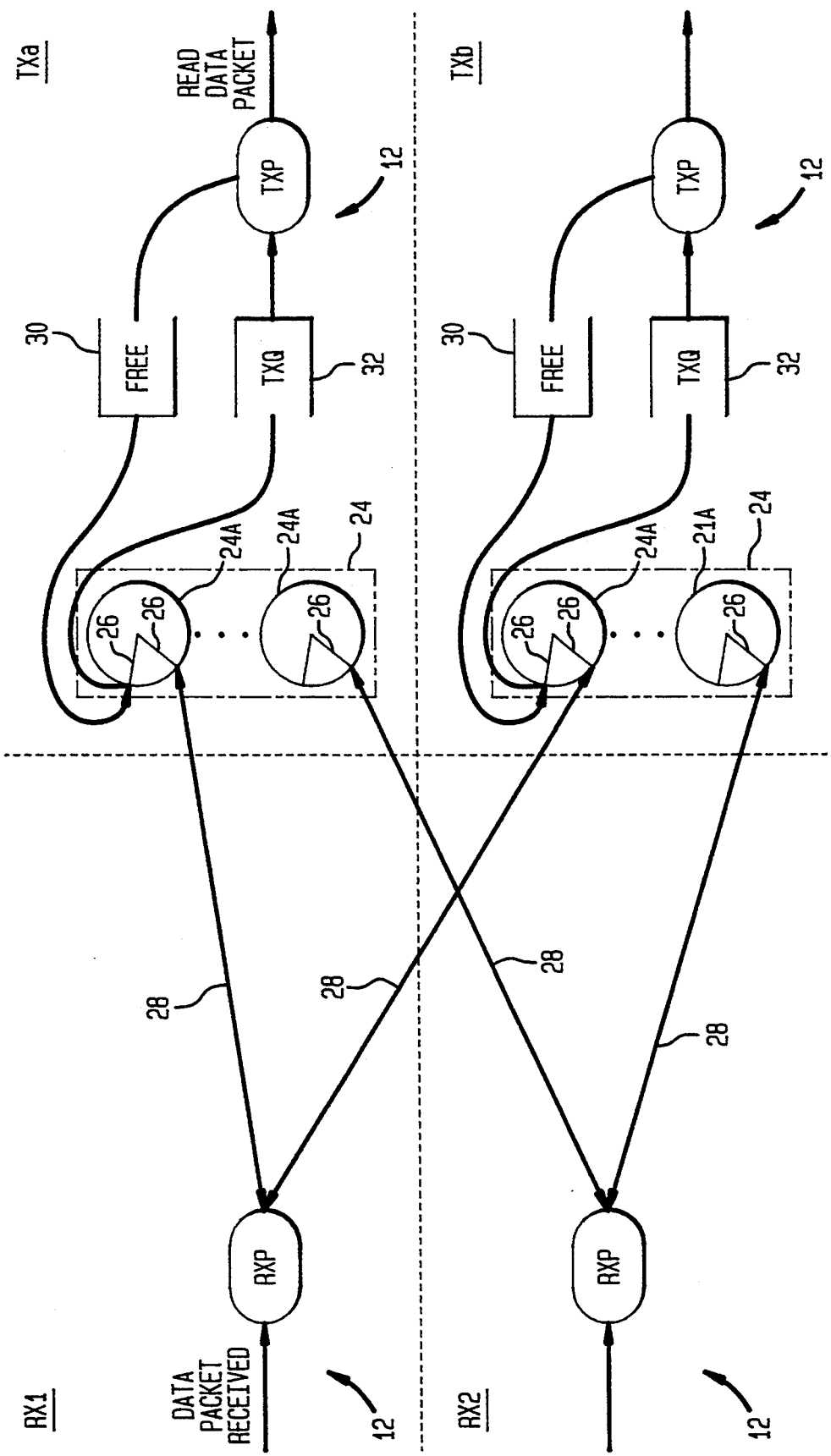
FIG. 2 is a schematic representation of the buffer swapping scheme, as implemented in the computer system of FIG. 1.

Referring now to FIG. 2, there is illustrated a schematic representation of the exemplary buffer swapping scheme that may be used in conjunction with the error detection scheme of the present invention. Each of RX1 and RX2 represents one of the line cards 12 when the respective line card is acting as a receiver (source) of data packets and Txa and Txb each represent one of the line cards 12 when the respective line card is acting as a transmitter (destination) of data packets. RXP represents a data packet receive module provided at each processor 20 of a line card 12 to process each received data packet while TXP represents a data packet transmit module provided at each processor 20 of a line card 12 to process each data packet for transmission.

As described above, each ring memory 24 is divided into n rings 24A, with each ring having a preselected number of memory locations 26 for the storage of pointers to buffers in the central memory 16. Each one of the n rings 24A of the ring memory 24 is assigned a preselected address by the computer system 10. Moreover, each ring 24A is dedicated for use by one of the RXP modules, as illustrated by the lines 28. Accordingly, each ring 24A is associated with a particular one of the RXP and TXP modules and is identifiable by its particular assigned address. This ring identification information is stored in a ring memory information table contained within a ring identification machine 412 (see FIG. 7) which comprises part of the buffer interchange observer 15. A FREE buffer queue 30 and a transmit (TXQ) buffer queue 32 is maintained by the TXP module of each line card 12.

When an RXP module needs to communicate a message (data packet) previously stored in a buffer of the central memory 16, to a particular TXP module, it will first read, via the bus 14, a location 26 of the dedicated ring 24A of the respective TXP line card 12. Each RXP can, e.g., maintain a ring pointer for each dedicated buffer ring 24A. Each ring pointer contains an address to a location 26 of the corresponding buffer ring 24A that is to be read during a particular transaction. The RXP module will increment the address value after each transaction to continuously traverse the ring memory 24A.

Figure 5:
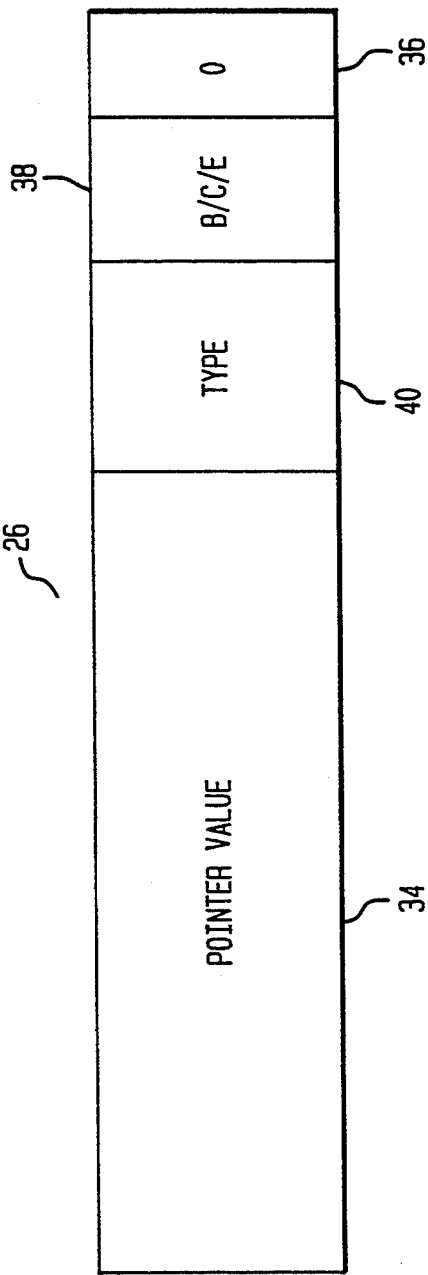
FIG. 5 is a block diagram of a pointer storage location.

Referring for a moment to FIG. 5, each location 26 includes a pointer value field 34 to store a pointer to a buffer of the central memory 16 and an ownership field 36 that comprises one bit representing either a set state or a clear state. The set state can represent ownership of the location 26 by the RXP module (the source processor) while the clear state can represent ownership of the location 26 by the TXP module (the destination processor). When the location 26 read by the RXP module is owned by that module, the pointer value 34 (See FIG. 5) is a pointer to a free buffer of the central memory 16. The RXP module will read the pointer value and snore that value for use in a subsequent message transfer, as will appear.

The RXP module will then write, via the bus 14, the pointer value 34 for the buffer where the message (data packet) is stored in the central memory 16 and change the state of the ownership field 36 to indicate ownership by the TXP module of the line card 12.

The buffer interchange observer 15 monitors the bus 14 and checks the above transactions involving the ring memory 24 for errors as will be described below.

Each TXP module is arranged to poll the locations 26 of the rings 24A located at the respective line card 12. When a location 26 is owned by the TXP module, the pointer value 36 stored at that location 26 is read and loaded into the TXQ queue 32. At that time, the TXP module will also write a pointer value from the FREE queue 30 into the location 26 and change the ownership bit to once again indicate that the location 26 is owned by the RXP module.

The TXP module will service each pointer loaded into the TXQ queue, as, e.g., on a FIFO basis, to access the central memory for each complete message a read transaction over the bus 14. After the TXP module has read the complete message associated with a particular pointer value, it will transfer that pointer value to the FREE queue 30 for use in a future buffer swap operation.

The buffer interchange observer 15 monitors the central memory and pointer transactions conducted via the bus 14 for errors as well as transactions involving each ring memory 24 conducted over the bus 14.

Figure 3:
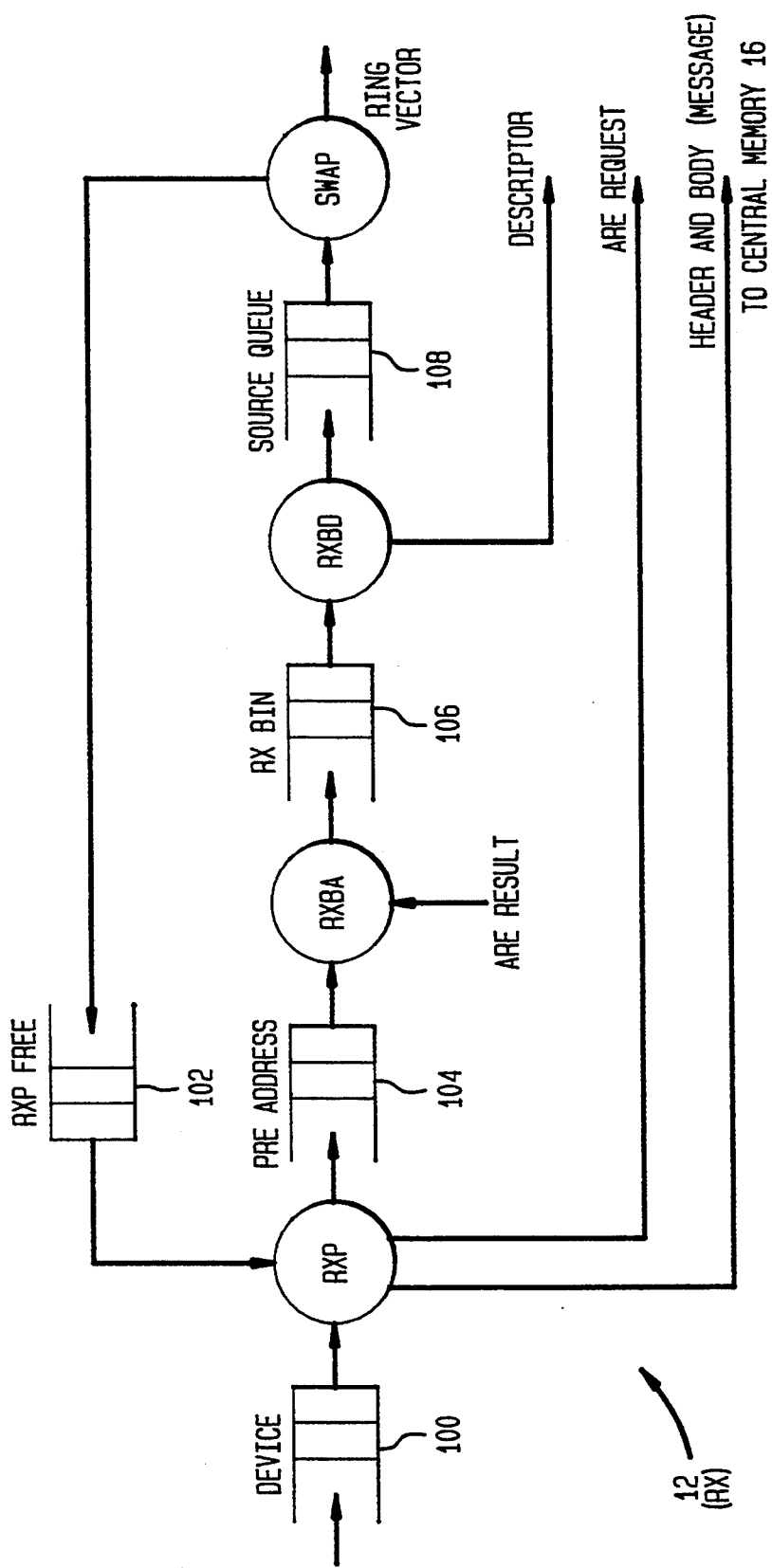
FIG. 3 is a block diagram of a source processor performing a buffer swap in respect of a message to be transmitted to a destination processor.
Figure 4:
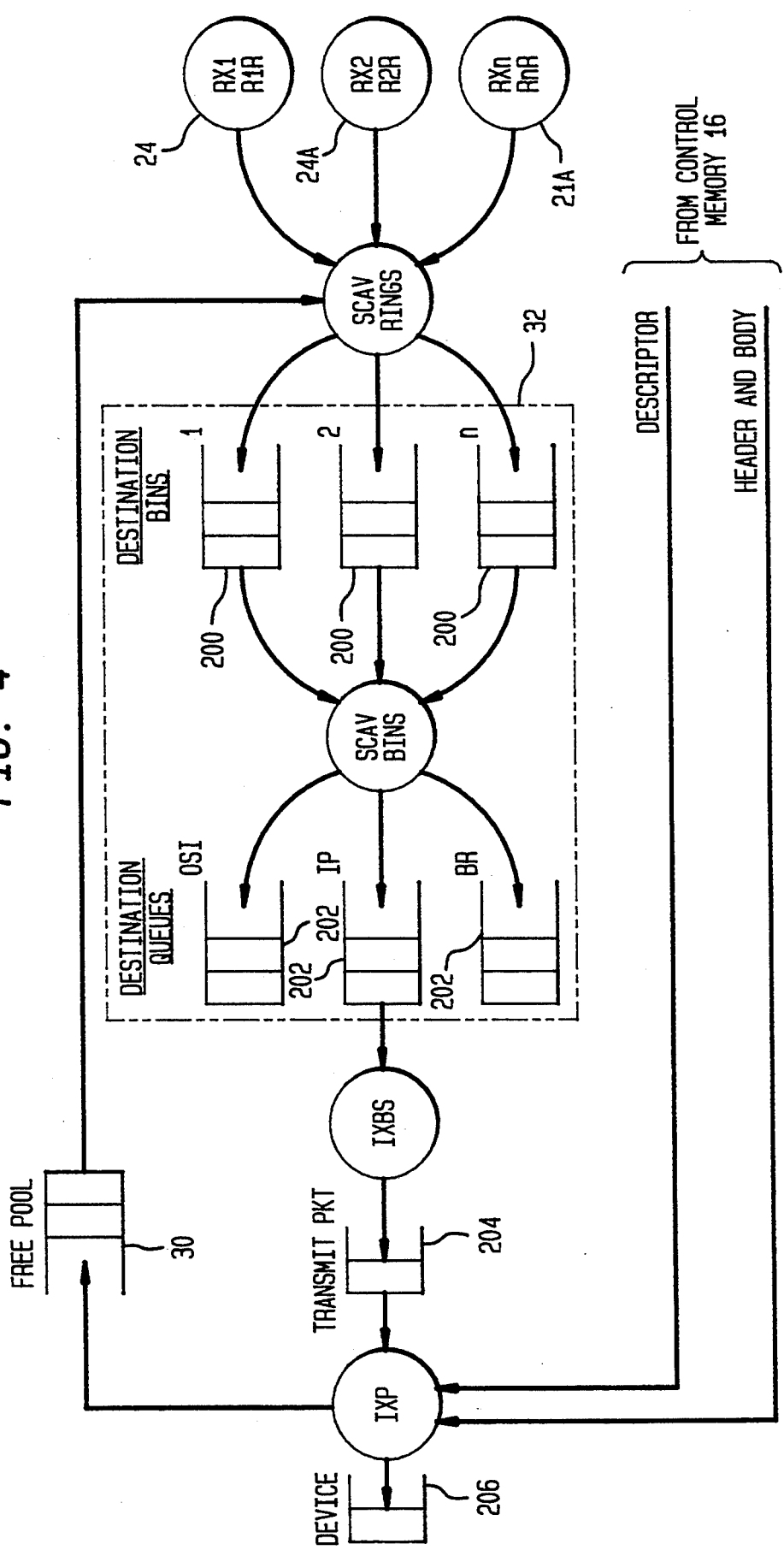
FIG. 4 is a block diagram of a destination processor performing a buffer swap in respect of a message transacted by a source processor.

As described above, buffers are automatically and continuously swapped between line cards 12 to facilitate message communication with a guaranteed return supply of free buffers with all such transactions conducted over the bus 14 being monitored for errors by the buffer interchange observer 15. FIGS. 3 and 4 illustrate the above described buffer swapping scheme, in greater detail, in respect of source and destination message processing, respectively.

As illustrated in FIG. 3, each complete message (data packet) is loaded into a DEVICE queue 100. The RXP module reads the messages, one at a time, from the DEVICE queue 100 and examines the header of each data packet to extract the network address to send to the address recognition engine 13 via the bus 14 to determine which TXP module is to receive the message (data packet) for transmission.

As described above, the buffer interchange observer 15 monitors the bus 14 and checks to insure that the RXP module accessing the address recognition engine 13 is authorized to perform such an access and that the access is conducted in accordance with the implemented ARE access scheme.

To that end an ARE request comprising the network address, is transmitted, via the bus 14, to the address recognition engine 13 (see FIG. 1) for relevant network information including the identity of the TXP module to be used to transmit the data packet. The RXP module also writes, via the bus 14, the data packet to a buffer in the central memory 16.

An RXP free buffer queue 102 stores a plurality of pointers to free buffers acquired from previous buffer swaps. The RXP module will read a top free buffer pointer from the queue 102 and write the current data packet to the buffer pointed to by the pointer. The RXP free buffer queue 102 enables the RXP module to pipeline data packet processing, i.e. the RXP module can begin to process a subsequent data packet from the DEVICE queue 100 before the return of a free buffer in respect of an immediately preceding data packet(s) by storing several free buffer pointers in the RXP free queue 102.

As should be understood, the data packet is written to the central memory buffer pointed to by the pointer obtained from the RXP free buffer queue 102 via a bus transaction over the bus 14 utilizing the bus interface 22 of the respective line card 12. The RXP module then writes the pointer value into a Pre-ADDRESS queue 104.

The buffer interchange observer 15 monitors the writing of the data packet to the central memory buffer and checks to insure that the buffer into which the RXP module writes the message, is owned by the RXP module at the time of the write operation.

RXBA is a sub-module of the RXP module arranged to receive the ARE result, obtained from the address recognition engine 13 and associate the result, including the identity of the TXP module to be used to transmit the data packet, with the pointer value for the data packet central memory location. The associated pointer/TXP information is loaded by the RXBA module into an Rx BIN 106 for eventual input to an RxBD module.

The RxBD module utilizes the input information to generate a descriptor containing network information relevant to the data packet. The descriptor is also written by the RxBD module to the buffer of the central memory, via a transaction over the bus 14, where the data packet itself is stored, for use by the TXP module in transmit processing. The descriptor can contain any network processing information performed by the RxP module that is also needed in the transmit processing performed by the TXP module. The RxBD module passes each associated pair of pointer/TXP information to a SOURCE queue 108.

A SWAP module removes associated pairs of pointer/TXP information from the SOURCE queue 108 and performs the series of bus transactions described above in regard to the TXP module portion of a data packet transfer, in respect of an owned location 26 of a corresponding ring 24A of the TXP module associated with a particular pointer in the pointer/TXP information. The free buffer obtained via the first bus transaction is loaded into the RXP free buffer queue 102 for use by the RXP module in subsequent message communications and the pointer obtained from the SOURCE queue 108 is written to the current location 26 of the corresponding ring 24A. The SWAP module also changes the ownership bit to indicate TXP ownership of the current location 26.

Referring now to FIG. 4, a ring polling module, SCAV RINGS, at each processor 20 of a line card 12, polls each location of the n rings 24A associated with the line card 12 to locate owned locations 26. The SCAV RINGS module is responsible to read the pointer of each owned location 26 and thereafter write a pointer from the FREE queue 30 into that location 26. The SCAV RINGS module will also change the ownership bit of the location 26 back to the RXP ownership state.

As illustrated in FIG. 4, the TXQ queue 32 comprises a set of destination bins 200 and a set of destination queues 202. Each destination bin 200 is dedicated to one of the rings 24A and each destination queue 202, in our representative embodiment of a multi-protocol router/bridge, is dedicated to a particular network protocol or bridging protocol, e.g., the OSI and IP network protocols and BR representing a bridging protocol. The bin/queue set arrangement is used to segregate messages, first by source and then by protocol type. This feature of the present invention provides flexibility in message handling, in respect of the source of the message and the type of message, as will appear.

Referring once again to FIG. 5, each location 26 includes a "beginning/continuation/last" marker field 38. All of the buffers of the central memory are of equal size to make certain that an equal amount of buffer space is swapped in each free buffer/message buffer exchange. The "beginning/continuation/last" marker field 38 provides a mechanism to link buffers together for communication of messages too large to be stored in a single buffer.

When an RXP module is communicating a message (data packet and associated descriptor) that is too large for a single buffer of the central memory 16, it will communicate the message in several buffers and link the buffers via the "beginning/continuation/last" marker field. The first portion of the message is placed in a first buffer and the RXP module sets the "beginning/continuation/last" marker field of the pointer to the first buffer to indicate a "beginning" buffer.

Buffers containing subsequent portions of the message are each stored in the central memory 16 with the respective marker fields of the respective pointers each set to indicate "continuation" until the last portion of the message. As should be understood, the RXP module will set the marker field for the buffer pointer containing the last portion of the message to indicate "last". The beginning, continuation and last buffer pointers will be stored in contiguous locations of the appropriate buffer ring 24A associated with the destination processor 20.

As with other bus transactions involving buffer accesses, the buffer interchange observer 15 monitors and checks the bus transactions including those involving pointers which indicate that each buffer only contains a portion of a particular message as indicated by the use of the "beginning/continuation/last" marker fields.

To implement a fair polling operation in the SCAV RINGS modules of the processors 20, each SCAV RINGS module can be arranged, e.g., to poll a location of a particular ring 24A and move on to each other ring 24A before returning to a next location of the particular ring 24A. Thus, the SCAV RINGS module does not remove the pointers linked by their respective "beginning/continuation/last" marker fields in order. The several destination bins 200 are used to accommodate a fair polling operation and still maintain a contiguous relationship between linked buffer pointers transmitted by a particular RXP module. Each SCAV RINGS module loads each pointer read from a particular ring 24A into the bin corresponding to that ring 24A so that all beginning, continuation, last buffer pointers remain contiguous as they move through the transmitting line card 12.

A SCAV BINS module is used to transfer buffer pointers from the destination bins 200 to appropriate destination queues 202. As described above, each destination queue 202 is dedicated to a particular protocol. As illustrated in FIG. 5, each location 26 is provided with a TYPE field 40 which is used to indicate the protocol to be used for transmission of the data packet in the message pointed to by the pointer value. The RXP module inserts the protocol type in the TYPE field prior to the buffer swap operation. The SCAV BINS module examines the "beginning/continuation/last" marker field and TYPE field for each pointer removed from a particular bin 200 and loads all linked buffer pointers for a particular message into the destination queue corresponding to the protocol indicated in the TYPE field.

The various destination queues are also used to introduce fairness into the system by providing a preselected limited size queue for each protocol type. A TxBS module removes pointers from the destination queues 202 in a straight round robin polling operation so that there is progress in transmitting messages of each protocol type and no one protocol can prevent any other protocol from making progress in transmitting messages. The multiple destination queue 202 arrangement is useful because protocols have different characteristics such as different congestion algorithms. Certain congestion algorithms can block other protocols by dominating router operation if the round robin sequence through the various protocol types were not implemented.

The TxBS module loads pointers removed from the destination queues 202 to a TRANSMIT PACKET queue 204. The TXP module of the line card 12 removes pointers from the TRANSMIT PACKET queue 204, one at a time, and utilizes each pointer to access the central memory 16, via the bus 14, to read the header and body of a data packet and the associated descriptor (the message) for transmit processing. The buffer interchange observer 15 monitors these bus transactions involving accesses to the central memory 16 and checks them for errors as will be described below.

The data packet obtained from the central memory 16 is placed in a DEVICE queue 206 for eventual transmission by the line interface 18 of the line card 12. In addition, the TXP module loads the pointer just used to access a message into the FREE buffer queue 30 for use by the SCAV RINGS module in a future buffer swap, as described above.

Figure 6A:
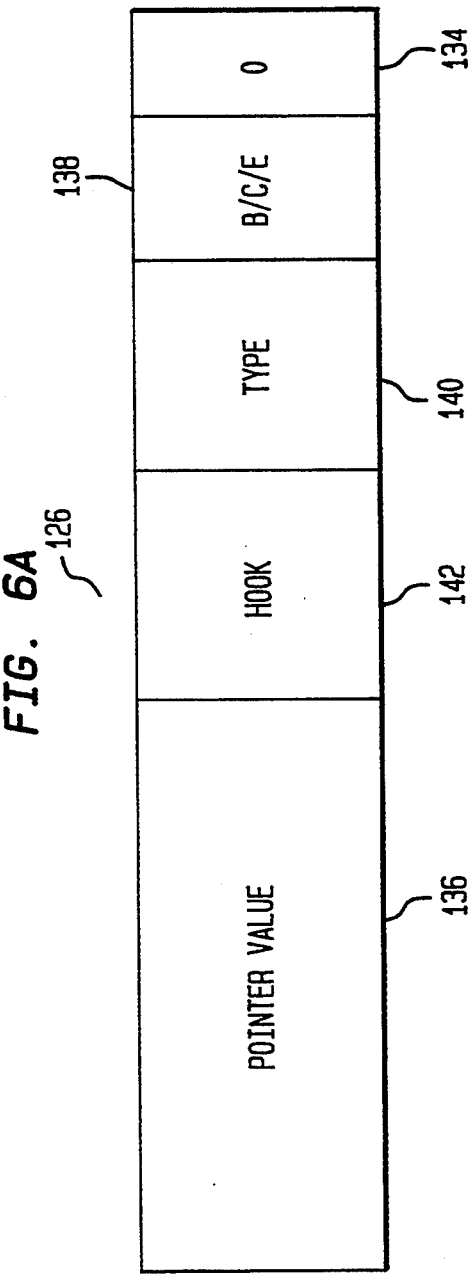
FIG. 6A is a block diagram for a pointer location used in a message broadcast.
Figure 6:
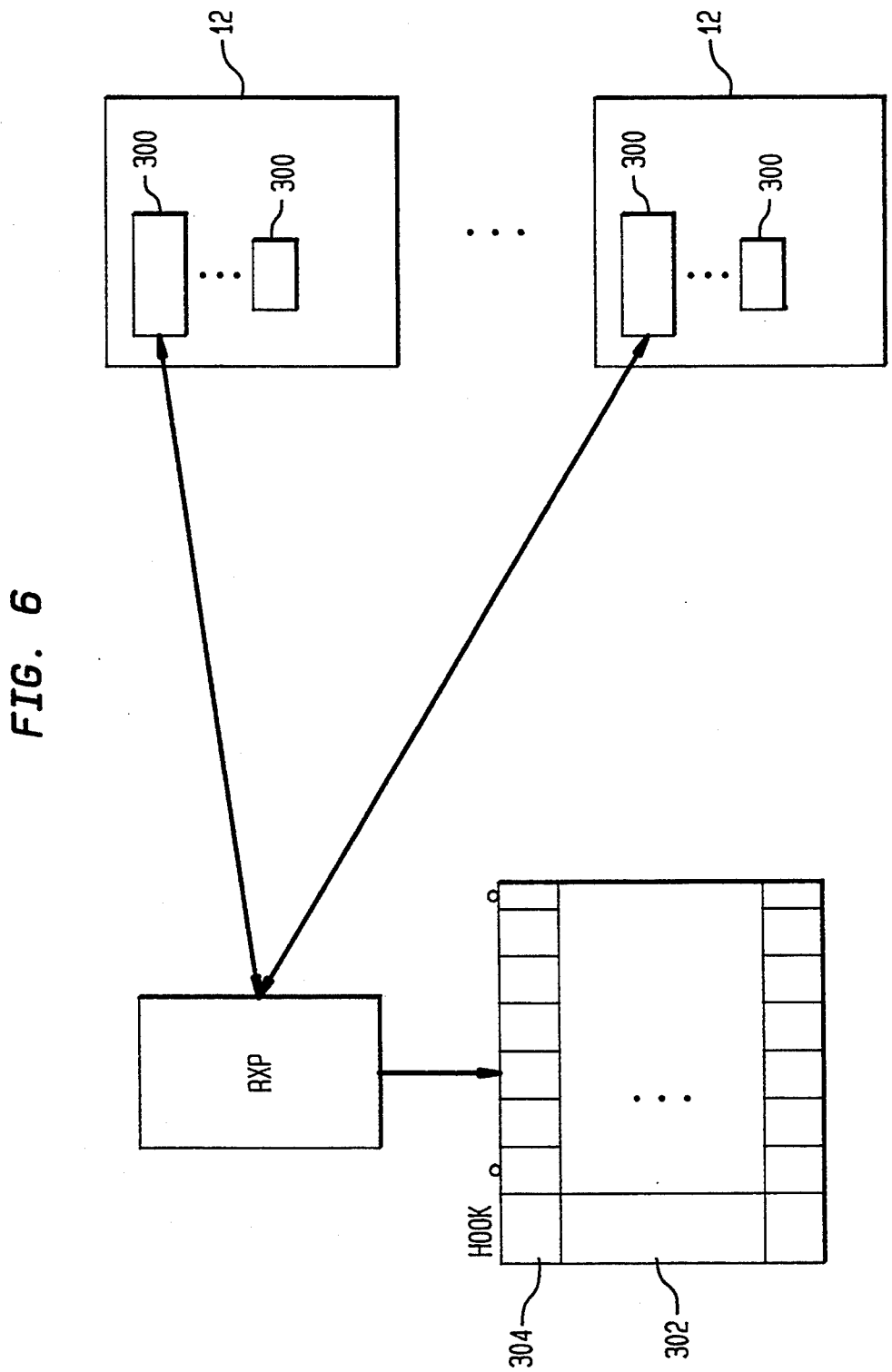
FIG. 6 is a block diagram of a mechanism for a message broadcast.

Referring now to FIGS. 6 and 6A, there is illustrated a mechanism and buffer pointer format for broadcasting a message to several destination processors. As illustrated in FIG. 6A, a broadcast pointer 126, for use in a broadcast, is provided with an ownership field 134, a pointer value field 136, "beginning/continuation/last" marker field 138 and TYPE field 140, as in the buffer pointer 26 of FIG. 5. In addition, each broadcast buffer pointer 126 is formatted to include a read permission field designated as a hook type field 142. An RXP module generates a hook value to identify a particular broadcast buffer pointer 126 for tracking the broadcast buffer pointer 126, as will appear.

As illustrated in FIG. 6, the RXP module broadcasting a message writes a broadcast pointer 126, containing the buffer pointer value for the buffer where the broadcast message is stored in the central memory 16 and hook value, to each destination processor that is to receive the broadcast. A special broadcast queue 300 is provided at each destination processor for each potential broadcast source. Broadcast buffer pointers 126 are written, into the corresponding broadcast queues of each destination line card meant to receive the message.

The broadcast queue 300 associated with each destination linecard comprises a series of preselected address locations at which the pointers and hook values for each destination processor may be stored. Accordingly, the buffer interchange observer 15 may determine the identity of both the source and destination processor 20 from the address of the broadcast queue 300 where a particular pointer is stored.

The SCAV RINGS modules of the destination line cards will also poll the broadcast queues, which have fixed preselected addresses like the other ring memory 24 on each line card 12, for messages via a read operation over the bus 14. The ownership bit of each location is used as in the regular message forwarding scheme to indicate whether a pointer is to a message to be read by the SCAV RINGS module. However, the type field 142 is interpreted by the destination SCAV RINGS modules to mean that it has read only access to the pointer location of the queue.

The buffer interchange observer 15, like the destination SCAV RINGS modules, can interpret the ownership and hook field information read from the queue 300 and it check for errors, as the destination SCAV RINGS modules read the information from the queue 300 via the bus 14.

After the SCAV RINGS module reads a broadcast queue location, it will set the ownership bit, via a bus operation, to indicate that the source once again owns the location of the broadcast queue for future use. This change in ownership is monitored by the buffer interchange observer 15 and is checked to insure that the queue location which is having its ownership transferred back to the source is in fact owned by the destination processor initiating the ownership transfer at the time of the transfer.

Each source line card 12 maintains a table 302 of hook values including an entry 304 for each specific hook value used in a broadcast pointer 126. Each entry 304 of the table 302 contains a set of bits, one for each potential destination processor 20. The RXP module sets only those bits at a particular entry 304 corresponding to the destination processors to which it sent the broadcast pointer 126 having the hook value of the entry 304.

The SCAV RINGS module of each destination processor 20 receiving a broadcast message sends, via a bus transaction, the hook number to the source corresponding to the broadcast queue from where it read the broadcast message. This can be accomplished via a pointer exchange according to the present invention in the broadcast queues. For example, a SCAV RINGS module will write via a bus operation a pointer with a hook value from a previously read broadcast message sent by a particular source into a location of the broadcast queue corresponding to the source, after it reads the location for a current broadcast message. The SCAV RINGS module then changes the ownership bit to indicate that the particular source again owns the location. Both of these operations are monitored by the buffer interchange observer 15 and checked for errors as will appear.

Upon reading each hook value during a buffer exchange in a broadcast queue, the RXP module clears, in the entry 304 of the table 302 indicated by the hook value, the bit corresponding to the destination processor 20 sending the hook value. When all of the bits for a hook value have been cleared, the source processor 20 knows all of the intended destination processors 20 have received the broadcast message and the broadcast pointer is once again free for use in another message transfer.

The exemplary buffer swapping scheme which may be used with the error detection scheme of the present invention also provides for null pointers that can be used under certain circumstances. For example, a null pointer can be returned by a destination processor 20 when it does not have pointers to free buffers for a temporary period, yet it is desirable to continue to make progress around a ring memory 24 until free buffers become available. This would be an exception to the buffer swap mechanism of the present invention, but provides a mechanism to handle temporary shortages of free buffer pointers at a particular destination processor 20. The null pointers can also be used at initialization of the system to populate the free buffer pools via an exchange of free buffer pointers for null pointers between a management processor on the management processor card 11 and the operating processors of the system via the ring memories 24 or to re-balance the number of buffers between the source and destination processors 20.

As with other pointer operations involving the buffer swapping scheme, the buffer interchange observer 15 of the present invention monitors the bus 14 for activity involving null pointers and checks that their use is consistent with the implemented buffer swapping scheme.

In addition to relying on the buffer interchange observer 15 of the present invention to detect errors, a SWAP module can be arranged to assert an alarm whenever a next location of a buffer ring accessed by the SWAP module is not owned by the source processor 20, as required by the buffer swapping scheme described above. This is a convenient way to insure that each destination processor 20 is making progress in accessing owned location to read buffer for messages. A destination can make progress, if necessary, by returning null pointers or merely changing the ownership bit back to indicate ownership by the corresponding source (and thereby disregarding the message). Thus, whenever a location is not owned by a respective source, this is usually an indication that the destination is not operating properly to either handle messages or to make progress around ring memories 24 by permitted alternatives (i.e. returning null pointers or changing the ownership bit).

Figure 7:
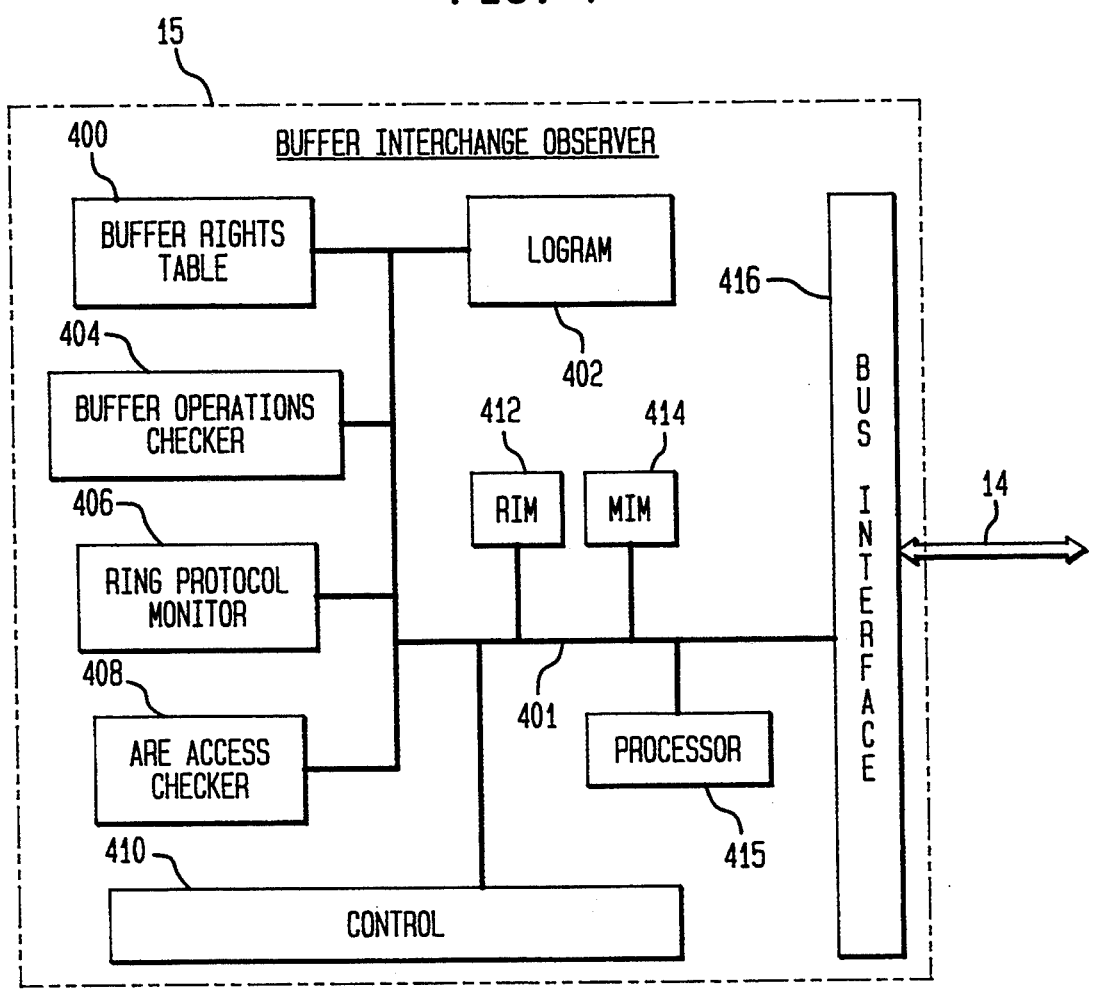
FIG. 7 is a block diagram of an exemplary embodiment of a circuit which may serve as the buffer interchange observer of FIG. 1.

Referring now to FIG. 7, there is illustrated a block diagram of an exemplary embodiment of a circuit which may be used as the buffer interchange observer 15 of the present invention. The buffer interchange observer 15 comprises several components which are used to monitor the bus 14, to check for errors, and to maintain a log of bus transactions including those that involve buffer or ring memory accesses and changes in buffer ownership.

The buffer interchange observer 15 comprises a bus 401 which couples the components of the buffer interchange observer 15 to one another. The components include a block of memory, referred to as a LOGRAM 402, for storing a record of bus transactions, a bus interface unit 416, a control logic block 410, a ring identification machine 412, a processor 415, a buffer operations checker 404, a buffer rights table 400, a ring protocol monitor 406, a master index machine 414, and an address recognition engine access checker 408.

The buffer interchange observer's bus interface unit 416 couples the buffer interchange observer 15 to the bus 14. This enables the buffer interchange observer 15 to monitor activity on the bus 14 and to interact with the line cards 12 and other devices coupled to the bus 14.

The processor 415 monitors activity on the bus 14 signaling the other components of the buffer interchange observer 15 whenever one of the modules, i.e. line cards 12, coupled to the bus 14, obtains access to the bus 14 or initiates a new bus transaction.

The LOGRAM 402 maintains a log of activity on the bus 14 and operates in parallel with the buffer interchange observer's error checking operations. In the event that an error is detected, the LOGRAM 402 can be frozen by the control logic block 410 and buffer swapping activity can be halted until the log can be analyzed and the error dealt with as is appropriate.

The processor 415 supplies the buffer interchange observer's master index machine 414 with the processor identification signal read from the bus whenever a new module is assigned access to the bus 14 and thus becomes the bus master. The master index machine 414, comprises a table of processor index numbers that provides the index number of the current bus master, i.e. a signal which identifies the particular processor 20 initiating the bus transaction. The master index machine's table of processor index numbers is initialized by the management processor card 11 upon power up or reset. The master index machine 414 determines the unique processor index number of each new bus master and supplies this information to the other components of the buffer interchange observer 15. Accordingly, the buffer operations checker 404, ring protocol monitor 406, and access recognition engine access checker 408 are supplied with the processor index number of any processor 20 initiating a bus transaction for use in their error checking operations.

The ring identification machine 412 is used by the buffer interchange observer 15 to determine whether a particular bus transaction involves a ring memory 24. As described above, the addresses of each ring memory is preselected and remains fixed during operation of the computer system.

The ring identification machine 412 maintains a ring memory information table of ring memory addresses and the particular source and destination processors 20 associated with each ring memory address. This table may be initialized by the management processor control card 11 upon power up or reset to reflect the addresses of the ring memories 24 and the processors 20 to which they are dedicated, in the computer system 10, which may vary depending on which line cards 12 are present in the computer system 10. By comparing the information contained in the ring memory information table and the address information read from the bus 14 by the bus interface unit 416 during a bus transaction, the ring identification machine 412 is able to determine if the particular bus transaction involves one of the ring memories 24. If one of the ring memories 24 is involved, based on the address of the particular ring memory accessed, the ring identification machine 412 determines the source and destination line cards 12 and thus processors 20, which are assigned use of the particular ring memory 24. This information is supplied to the buffer interchange observer's ring protocol monitor 406 to be used when checking for errors. The buffer interchange observer's buffer rights table 400 which, like the other information tables of the buffer operations checker 15 is initialized by the management processor card 11 on power up or reset. The buffer rights table 400 comprises a table of information about each buffer which may include, e.g., data on buffer ownership and data on which processors 20 have permission to read particular buffers. Such read permission information is relevant when messages are broadcast to multiple processors 20 in the computer system 10 and read-only access is given to the buffer containing the message being broadcast.

The buffer rights table 400 supplies the buffer ownership and other information which it stores in its data table to both the buffer operations checker 404 and ring protocol monitor 406 for use in error checking operations. The buffer operations checker 404 is responsible for the updating and maintenance of the buffer rights table entries, including buffer ownership information, after initialization by the management processor card 11.

In addition to being responsible for maintaining the buffer rights table 400, the buffer operations checker 404 is used to identify and check the validity of operations involving accesses to the buffers contained in the central buffer memory 16 including transfers of buffer ownership. Accordingly, using the information provided by the master index machine 414 and the buffer rights table 400, the buffer operations checker 404 checks for a series of buffer access and transfer errors.

In particular, the buffer operations checker 404 checks to insure that a buffer is not: 1) written to by one of the processors 20 that is not the owner of the buffer; 2) read by one of the processors 20 that does not have read permission for that buffer; and 3) written to while any of the other processors 20 still have not relinquished read permission for that buffer.

In addition, the buffer operations checker 404 checks for a series of buffer transfer errors. For example, the buffer operations checker 404 checks to ensure that one of the processors 20 does not: 1) transfer ownership of a buffer which it does not own; 2) give read permission for a buffer that it does not own to another processor 20; 3) give read permission to another processor 20 that already has read permission; 4) relinquish read permission for a buffer to another processor 20 that is not the owner of the buffer; 5) relinquish read permission for a buffer without having read permission in the first place;

and 6) transfer ownership of a buffer while any other processor 20 still has not relinquished read permission for the buffer.

While the buffer operations checker 404 monitors accesses to the buffers, the ring protocol monitor 406 monitors and verifies processor accesses to the ring memories 24. Using the information provided by the master index machine 414, the buffer rights table 400, the ring identification machine 412, and information on the implemented buffer swapping protocol, the ring protocol monitor 406 verifies each processor's right to access the ring memories 24 during any given bus transaction that is monitored by the buffer interchange observer 15.

The ring protocol monitor 406 checks to insure that none of the processors 20: 1) accesses an incorrect ring memory 24; 2) write to a ring memory 24 before performing a read of that ring memory to ensure valid ownership; 3) proceed, after having established valid ownership through a read operation, to perform another read of the same ring entry; 4) proceed to perform a write or read to/from another ring memory 24A after establishing ownership of a particular ring memory 24A; 5) write to a ring memory 24A after a read of the ring memory 24A has established that the processor 20 initiating the read does not own the ring memory 24A; and 6) do not perform read/writes that take more or less time than is normal to read/write information from or to the ring memory 24A.

The buffer interchange observer's address recognition engine ("ARE") access checker 408 maintains an ARE access table of processors 20 which are authorized to access the address recognition engine 13 and the ARE ring buffers 7 of the request/response RAM 6 which are associated with each processor 20. The ARE access table is initialized at power up or rest by the management processor card 11. The ARE access checker 408 receives the processor index number used to identify a processor initiating a bus transaction from the master index machine 414.

The ARE access checker 408 uses the processor index number, which identifies the processor 20 initiating the bus transaction, provided by the master index machine 414 and the information contained in its table of authorized processors to perform a series of checks to detect any errors that may be associated with an ARE access operation. For example the ARE access checker 408 checks to insure that the ARE ring buffers 7 are accessed only by the processor 20 to which the particular ARE ring buffer 7 is dedicated. The ARE access checker 408 also checks to insure that the processors 20 contained on the line cards 12 1) do not write to ARE buffer rings that they do not own; 2) do not write to the ARE ring buffers in a non sequential circular order; and 3) do not read from the ARE ring buffers in a non sequential circular order. Thus, the ARE access checker 408 checks to insure that processors 20 access the address recognition engine 13 in accordance with the implemented access scheme.

Thus, as described above, the various components which comprise the buffer interchange observer 15 work together to detect buffer access errors; buffer transfer errors; ring memory errors; and address recognition engine access errors.

Upon detection of an error, the buffer interchange observer's control logic block 410 asserts an error signal over the bus 14, freezes the LOGRAM 402 and halts buffer swapping activity. Assertion of the error signal over the bus 14 informs the management processor card 11 and the line cards 12 of the occurrence of an error. The management processor control card 11 can then access the buffer interchange observer's LOGRAM 402 and buffer rights table 400 to obtain the information contained therein for use in investigating and correcting the detected error.

Upon taking appropriate action in response to the error, the management processor card 11 can signal the buffer interchange monitor's control logic block 410 to resume normal operation of the buffer interchange monitor 15 and to permit buffer swapping activity to resume.

What is claimed is:

1. A computer system, which comprises:
a plurality of source devices, each one of the plurality of source devices being a source of messages;
a plurality of destination devices, each one of the plurality of destination devices being a destination of messages;
a common memory comprising a plurality of buffers for storing messages from any one of the plurality of source devices for passing to any of the plurality of destination devices,
a system bus for coupling each one of the plurality of source and destination devices to each other and to the common memory;
a pool of pointers to buffers of the common memory that are available for use to store messages;
a plurality of pointer memories coupled to each one of the plurality of source and destination devices, each one of the plurality of pointer memories being associated with a particular pair of source and destination devices,
each pointer memory having a set of locations for storing pointers to buffers of the common memory; and
one particular source device of the plurality of source devices transferring a message to one particular destination device of the plurality of destination devices by writing the message to one of the plurality of buffers, and writing the pointer to the one of the plurality of buffers to a preselected location of the pointer memory associated with the particular source and destination device pair,
the particular destination device reading the pointer to the one of the plurality of buffers from the preselected location of the pointer memory;
a buffer interchange observer coupled to the plurality of source and destination devices and to the central memory by the system bus, the buffer interchange observer comprising a pointer memory protocol monitor monitoring accesses to the pointer memories and checking that only the particular source and destination devices associated with a particular pointer memory access the particular pointer memory.

2. The computer system of claim 1, wherein the buffer interchange observer further comprises a master index machine identifying any device initiating a pointer memory access operation and supplies the pointer memory protocol monitor with device identification information identifying the device initiating the pointer memory access operation.

3. The computer system of claim 2, wherein the buffer interchange observer further comprises a memory pointer identification machine including a pointer memory information table containing information on each pointer memory including the particular source and destination device associated with each pointer memory location, the memory pointer index machine identifying any source or destination device accesses to pointer memory locations and identifying the particular source and destination devices associated with the pointer memory being accessed.

4. The computer system of claim 3 wherein the memory pointer protocol monitor receives the device identification information from the master index machine and the identity of the source and destination device associated with the accessed pointer memory from the memory pointer identification machine, the pointer memory protocol monitor checking that the device identified by the master index machine is either the source or destination processor associated with the particular pointer memory being accessed.

5. The computer system of claim 4, wherein the memory pointer protocol monitor asserts an error signal in response to an access of a particular pointer memory by a device not associated with the particular pointer memory.

6. The computer system of claim 4, wherein each location of the pointer memory includes an ownership field having a first state and a second state, the first state indicating that the corresponding location is owned by the source processor, and stores a pointer to a buffer that is owned by the source device associated with the particular pointer memory, the stored pointer being valid for use by the source device to store a message, and the second state indicating that the corresponding destination device owns the particular pointer memory location and that the corresponding location stores a pointer to a buffer owned by the destination device associated with the particular pointer location, the stored pointer being valid for use by the destination device to read a message at the buffer of the common memory pointed to by the pointer, the particular source and destination devices associated with the particular pointer memory location operating to change the state of the ownership field as pointers to messages are exchanged between the source and destination devices;

the buffer interchange observer's pointer memory protocol monitor checks that each device changes the state of the ownership field associated with a particular pointer memory location only after preforming a read of the particular memory location.

7. The computer system of claim 6, wherein the buffer interchange observer further comprises a buffer rights table including information on buffer ownership, and a buffer operations checker, the buffer operations checker receiving processor identification information from the master index machine, the buffer operations checker using the information contained in the buffer rights table and the information received from the master index machine to check that a particular device accessing a particular buffer in common memory owns the particular buffer.

8. The computer system of claim 7, wherein the buffer operations checker receives pointer memory access information from the pointer memory index machine and checks that transfers of buffer ownership, via the changing of the state of the ownership field associated with a pointer memory location, are initiated only by devices owning the particular buffer at the time of the initiation of the ownership transfer.

9. The computer system of claim 8, wherein the buffer operations checker further comprises a logram logic block maintaining a log of transactions involving the buffers or pointer memories.

10. The computer system of claim 9 wherein the buffer interchange observer further comprises a control logic block freezing the log maintained by the logram logic block upon detection of a check failure.

11. The computer system of claim 2, wherein the buffer interchange observer further comprises a buffer rights table including information on buffer ownership, and a buffer operations checker, the buffer operations checker receiving processor identification information from the master index machine, the buffer operations checker using the information contained in the buffer rights table and the information received from the master index machine to check that a particular device accessing a particular buffer in common memory owns the particular buffer.

12. The computer system of claim 11, further comprising an access recognition engine coupled to the plurality of source and destination devices by the system bus, the access recognition engine including a request/response RAM for storing access recognition requests and responses to the requests, the request/response RAM including a plurality of memory locations, each memory location being associated with a particular one of the plurality of source devices; and wherein the buffer interchange observer further comprises an access recognition engine checker checking that any device accessing a particular request/response RAM memory location is the particular source device associated with the particular request/response RAM memory location.

13. The computer system of claim 12, wherein the plurality of pointer memories is coupled to each one of the plurality of source and destination devices, the common memory and to the buffer interchange observer by the system bus.

14. The computer system of claim 13, wherein the buffer operations checker further comprises a logram logic block maintaining a log of bus transactions involving the buffer or pointer memory accesses.

15. The computer system of claim 14, wherein the buffer interchange observer further comprises a control logic block freezing the log of the logram logic block upon detection of a failed check.

16. The computer system of claim 15, further comprising a management processor card coupled to the bus, the management processor card initializing the buffer rights table and the memory pointer index machine's pointer memory table upon power-up of the computer system.

17. The computer system of claim 16, wherein the buffer interchange monitor asserts an error signal over the bus upon detection of a failed check and the management processor card operates to investigate the cause of the error signal.

18. The computer system of claim 1, wherein the plurality of pointer memories is coupled to each one of the plurality of source and destination devices, the common memory and to the buffer interchange observer by the system bus.

19. The computer system of claim 1, wherein the buffer operations checker further comprises a logram logic block maintaining a log of transactions involving the buffers or pointer memories.

20. The computer system of claim 19 wherein the buffer interchange observer further comprises a control logic block freezing the log maintained by the logram logic block upon detection of a check failure.

21. The computer system of claim 1 further comprising,
an access recognition engine coupled to the plurality of source and destination devices, the access recognition engine including a request/response RAM for storing access recognition requests and responses to the requests,
the request/response RAM including a plurality of memory locations, each memory location being associated with a particular one of the plurality of source devices; and
wherein the buffer interchange observer further comprises an access recognition engine checker checking that any device accessing a particular request/response RAM memory location is the particular source device associated with the particular request/response RAM memory location.

22. A computer system, which comprises:
a plurality of source devices, each one of the plurality of source devices being a source of messages;
a plurality of destination devices, each one of the plurality of destination devices being a destination of messages;
a common memory comprising a plurality of buffers for storing messages from any one of the plurality of source devices for passing to any of the plurality of destination devices,
a system bus for coupling each one of the plurality of source and destination devices to each other and to the common memory;
a pool of pointers to buffers of the common memory that are available for use to store messages;
an access recognition engine coupled to the plurality of source and destination devices by the system bus, the access recognition engine including a request/response RAM for storing access recognition requests and responses to the requests,
the request/response RAM including a plurality of memory locations, each memory location being associated with a particular one of the plurality of source devices;
a plurality of pointer memories coupled to each one of the plurality of source and destination devices, each one of the plurality of pointer memories being associated with a particular pair of source and destination devices,
each pointer memory having a set of locations for storing pointers to buffers of the common memory; and
one particular source device of the plurality of source devices accessing the address recognition engine to determine which one particular destination device of the plurality of destination devices to transfer a message to,
the one particular source device transferring the message to the one particular destination device by writing the message to one of the plurality of buffers, and writing the pointer to the one of the plural-ity of buffers to a preselected location of the pointer memory associated with the particular source and destination device pair,
the particular destination device reading the pointer to the one of the plurality of buffers from the preselected location of the pointer memory; and
an access recognition engine checker coupled to the plurality of source and destination devices and the common memory by the system bus, the access recognition engine checker checking that any device accessing a particular request/response RAM memory location is the particular source device associated with the particular request/response RAM memory location.

23. A computer system, which comprises:
a plurality of source devices, each one of the plurality of source devices being a source of messages;
a plurality of destination devices, each one of the plurality of destination devices being a destination of messages;
a common memory comprising a plurality of buffers for storing messages from any one of the plurality of source devices for passing to any of the plurality of destination devices,
a system bus for coupling each one of the plurality of source and destination devices to each other and to the common memory;
a pool of pointers to buffers of the common memory that are available for use to store messages;
a plurality of pointer memories coupled to each one of the plurality of source and destination devices, each one of the plurality of pointer memories being associated with a particular pair of source and destination devices,
each pointer memory having a set of locations for storing pointers to buffers of the common memory,
each location of the pointer memory including an ownership field having a first state and a second state, the first state indicating that the corresponding location is owned by the source processor, and stores a pointer to a buffer that is owned by the source device associated with the particular pointer memory, the stored pointer being valid for use by the source device to store a message, and the second state indicating that the corresponding destination device owns the particular pointer memory location and that the corresponding location stores a pointer to a buffer owned by the destination device associated with the particular pointer location, the stored pointer being valid for use by the destination device to read a message at the buffer of the common memory pointed to by the pointer,
the particular source and destination devices associated with the particular pointer memory location operating to change the state of the ownership field as pointers to messages are exchanged between the source and destination devices;
one particular source device of the plurality of source devices transferring a message to one particular destination device of the plurality of destination devices by writing the message to one of the plurality of buffers, and writing the pointer to the one of the plurality of buffers to a preselected location of the pointer memory associated with the particular source and destination device pair, the particular destination device reading the pointer to the one of the plurality of buffers from the preselected location of the pointer memory;

a buffer interchange observer coupled to the plurality of source and destination devices and to the central memory by the system bus, the buffer interchange observer comprising a buffer rights table including information on buffer ownership, and a buffer operations checker, the buffer operations checker using the information contained in the buffer rights table and to check that a particular device accessing a particular buffer in common memory owns the particular buffer.

24. A method of detecting errors in a multiprocessor computer system implementing a buffer swapping scheme for communicating messages between a plurality of source and destination devices, the computer system having a common memory comprising a plurality of buffers coupled to the plurality of source and destination devices by a system bus, the method comprising the steps of:

creating a pool of pointers to the buffers in the common memory that are available for use to store messages;

associating each one of a plurality of pointer memories with a particular pair of the plurality of source and destination devices, each pointer memory having a set of locations for storing pointers to the buffers of the common memory;

storing a message from a particular one of the plurality of source devices, for passing to a particular one of the plurality of destination devices, in one of the plurality of buffers of the common memory;

writing the pointer to the one of the plurality of buffers to a preselected location of the pointer memory associated with the particular source and destination device pair; and monitoring accesses to the pointer memories and checking that only the particular source and destination devices associated with a particular pointer memory access the particular pointer memory.

* * * * *